United States Patent
Matsui et al.

(10) Patent No.: US 11,739,981 B1
(45) Date of Patent: Aug. 29, 2023

(54) ISOLATION VALVE

(71) Applicant: MATSUIKIKI INDUSTRIES CO., LTD., Nagahama (JP)

(72) Inventors: Sadanori Matsui, Nagahama (JP); Yukikazu Terada, Nagahama (JP); Takashi Kitagawa, Nagahama (JP)

(73) Assignee: MATSUIKIKI INDUSTRIES CO., LTD, Nagahama (JP)

( * ) Notice: Subject to any disclaimer, the term of this patent is extended or adjusted under 35 U.S.C. 154(b) by 0 days.

(21) Appl. No.: 17/666,563

(22) Filed: Feb. 8, 2022

(51) Int. Cl.
F24H 9/00 (2022.01)
F16K 11/22 (2006.01)
F24H 1/10 (2022.01)

(52) U.S. Cl.
CPC ............ F24H 9/0042 (2013.01); F16K 11/22 (2013.01); *F24H 1/10* (2013.01)

(58) Field of Classification Search
CPC ........... F24H 9/0042; F24H 1/10; F16K 11/22
See application file for complete search history.

(56) References Cited

U.S. PATENT DOCUMENTS

| | | | |
|---|---|---|---|
| 6,648,009 B1 | 11/2003 | Craig et al. | |
| 7,621,295 B2 | 11/2009 | Reck | |
| 7,631,662 B2 | 12/2009 | Reck | |
| 7,644,730 B2 | 1/2010 | Reck | |
| 7,681,596 B2 | 3/2010 | Reck | |
| 7,789,106 B2 | 9/2010 | Reck | |
| 7,857,002 B2 | 12/2010 | Reck | |
| 10,408,353 B2 * | 9/2019 | Balmforth | F16K 24/02 |
| 10,655,752 B2 * | 5/2020 | Weisgurt | F16K 31/602 |
| 2005/0067032 A1 * | 3/2005 | Huang | F16K 11/205 |
| | | | 137/881 |
| 2008/0314466 A1 * | 12/2008 | Cimberio | F16K 11/20 |
| | | | 137/883 |
| 2021/0108839 A1 | 4/2021 | DeCandia | |

* cited by examiner

*Primary Examiner* — Michael R Reid

(57) ABSTRACT

An isolation valve including a main body including a fluid passage, a first port connected to the fluid passage, a second port connected to the fluid passage, a third port including an openable and closable valve, the valve connecting the third port to the fluid passage, and a plug removably coupled to the second port.

15 Claims, 8 Drawing Sheets

Fig.10A
Fig.10B
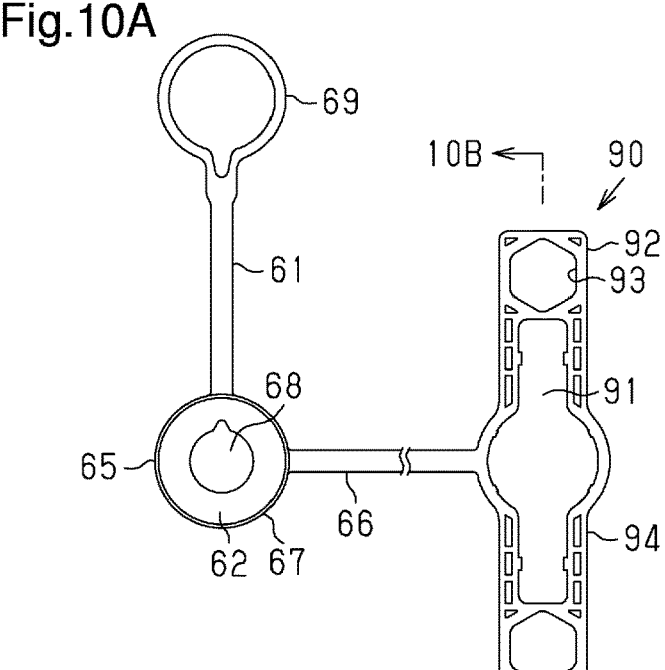
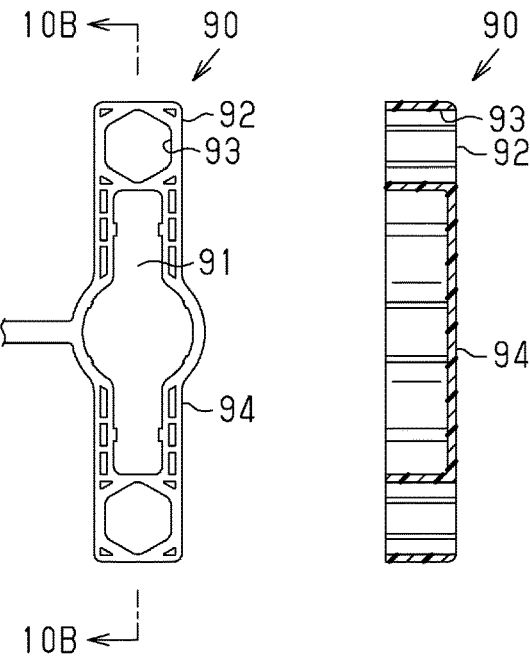
Fig.11
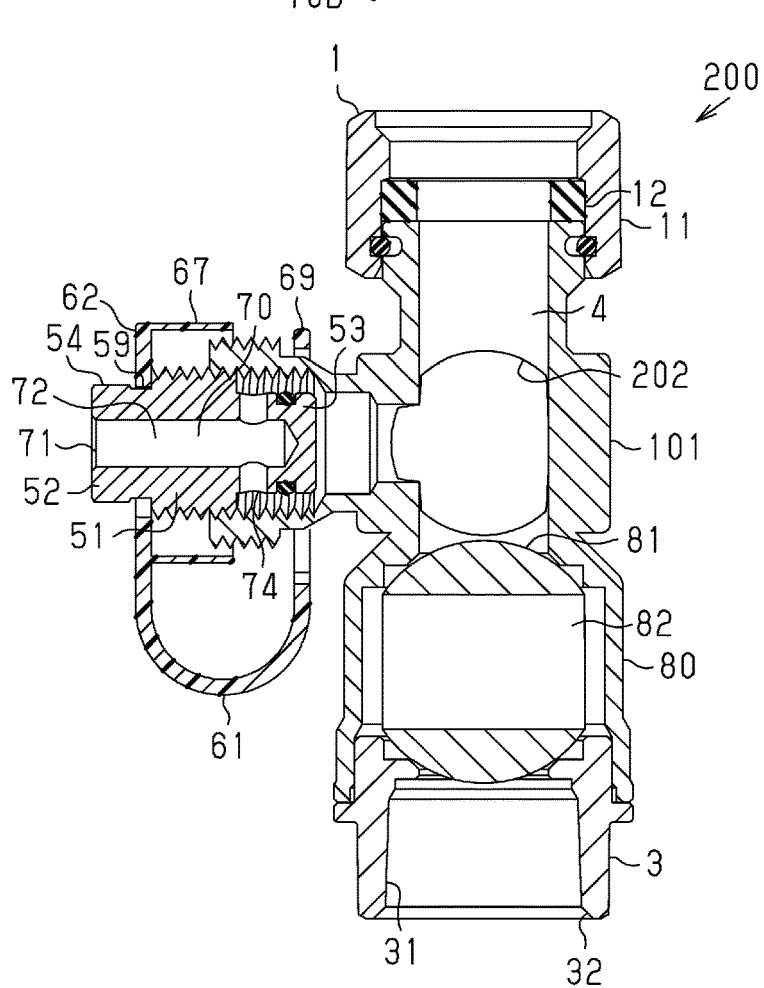

ISOLATION VALVE

BACKGROUND

1. Field

The present invention relates to an isolation valve used in a bypass system for a tankless water heater. In particular, the isolation valve includes three openings, one having a valve and another having a removable plug.

2. Description of Related Art

A conventional isolation valve includes three fluid flow ports. The second and third fluid flow ports each include a ball valve so as to allow the respective port to be opened or closed, while the first fluid flow port does not include a ball valve and so is always open.

Isolation valves are used with tankless water heaters to isolate the water heater from the input and output water feeds so as to allow the system to be drained and flushed during cleaning. A tankless water heater system will normally include a water input and a hot water output. A first isolation valve is located upstream of the tankless water heater to connect the water heater to the water source and a second isolation valve is located downstream from the tankless water heater to connect the water heater to the water destination.

In the first isolation valve, the third port is attached to the water source and includes a first ball valve, the first port is attached to the input of the water heater, and the second port acts as a bypass and includes a second ball valve. In the second isolation valve, the third port is attached to the water destination and includes a first ball valve, the first port is attached to the hot water output of the water heater, and the second port acts as a bypass and includes a second ball valve.

During normal operation, in the first isolation valve, the first ball valve attached to the third port is open to allow water to flow from a water source to the water heater, while the second ball valve for the second port bypass is closed. Similarly, in the second isolation valve, the first ball valve attached to the third port is open to allow water to flow from the water heater to the water destination, while the second ball valve for the second port bypass is closed.

During a cleaning operation, in the first isolation valve, the first ball valve attached to the third port is closed to isolate the water heater from the water source and the second ball valve for the bypass is opened. Similarly, in the second isolation valve, the first ball valve attached to the third port is closed to isolate the water heater from the water destination and the second ball valve for the bypass is opened. When the second ball valves are opened on the two isolation valves, the fluid contained in the water heater is drained. A flushing system can then be attached to the second bypass ports and cleaning fluid can be circulated through the water heater. This allows the tankless water heater to be cleaned. This allows the removal of scaling in the tankless water heating system caused by, for example, minerals in the water.

SUMMARY

This Summary is provided to introduce a selection of concepts in a simplified form that are further described in the Detailed Description. This Summary is not intended to identify key or essential features of the claimed subject matter, nor is it intended to be used as an aid in determining the scope of the claimed subject matter.

Technical Problem

Ball valves are large components and require a relatively large amount of raw materials, such as brass, to manufacture. In addition, the manufacturing process for making a ball valve is complicated with relatively high tolerances required for proper operation. Therefore, each ball valve included in the isolation valve increases both the size of the isolation valve and the cost of manufacturing.

Solution to Problem

In view of the above, it is desirable to replace one of the ball valves in an isolation valve with another component having a smaller size and lower material volume. Due to the desirability of being able to easily turn off and on the input and output supply of the water to the tankless water heater, it is deemed desirable to replace the ball valve located on the second (bypass) port with a plug.

An isolation valve according to one aspect includes an isolation valve including a main body having a fluid passage, a first port connected to the fluid passage, a second port connected to the fluid passage, a third port including an openable and closable valve, the valve connecting the third port to the fluid passage, and a plug removably coupled to the second port.

Another exemplary aspect of the invention is the isolation valve where the second port includes an outlet including an opening to an outside of the isolation valve, an internally threaded section formed on a portion of an inner surface of the outlet, and a first tapered portion having a diameter which decreases as the first tapered portion extends away from the outlet, a first angle is defined by the first tapered portion relative to a central axis of the outlet. In this aspect the plug includes a center portion, a proximal end portion located on a side of the center portion opposite the second port, a distal end portion located on a side of the center portion opposite the proximal end portion, the distal end portion including a second tapered portion, the second tapered portion being shaped so as to engage the first tapered portion of the second port when the plug is in a closed position, a second angle is defined by the second tapered portion relative to a central axis of the plug, threads located on an outer diameter of the center portion and configured to engage the internally threaded section of the second port.

Another exemplary aspect of the invention is the isolation valve where the first angle is not equal to the second angle.

Another exemplary aspect of the invention is the isolation valve where the first angle is less than the second angle.

Another exemplary aspect of the invention is the isolation valve where the first angle is equal to the second angle.

Another exemplary aspect of the invention is the isolation valve where the plug further includes a drain, the drain including a main passage extending through the center portion, a drain outlet in the proximal end portion and connected to the main passage, and an inlet including an inlet opening in the center portion and extending from the inlet opening to the main passage, the inlet opening being disposed between, in an axial direction of the plug, the threads and the second tapered portion.

Another exemplary aspect of the invention is the isolation valve where the drain includes two of the inlets, the inlets having a same central axis which extends through the central axis of the main passage.

Another exemplary aspect of the invention is the isolation valve where the plug further includes a recess on an outer surface of the plug between the threads and the distal end portion, and an O-ring disposed in the recess so as to contact a portion of the inner surface of the outlet adjacent to the internally threaded section when the plug is in the closed position.

Another exemplary aspect of the invention is the isolation valve where the valve of the third port is a ball valve including a handle to open and close the ball valve, and where the proximal end portion of the plug includes a tool receiving portion.

Another exemplary aspect of the invention is the isolation valve where the second port further includes an externally threaded section formed on a portion of an outer surface of the outlet.

Another exemplary aspect of the invention is the isolation valve further includes a removeable cover which covers a portion of the isolation valve.

Another exemplary aspect of the invention is the isolation valve where the cover includes a plug cover which covers at least a portion of the externally threaded section of the second port.

Another exemplary aspect of the invention is the isolation valve where the plug further includes a groove disposed between the threads and the proximal end portion, the cover is formed of a flexible material, and the cover further includes an attachment member connected to the plug cover and the groove.

Another exemplary aspect of the invention is the isolation valve where the cover includes a handle portion, the handle portion including a recess shaped to fit onto the handle of the ball valve, and a plug coupling portion shaped so as to engage with the tool receiving portion of the plug.

Another exemplary aspect of the invention is the isolation valve where the plug coupling portion is configured to elastically deform so as to cause slipping on the tool receiving portion of the plug when a predetermined amount of torque is applied to the plug coupling portion.

Another exemplary aspect of the invention is the isolation valve which further includes a pressure relief valve port connected to the fluid passage and configured to receive a pressure relief valve.

Another exemplary aspect of the invention is a tankless water heating system including a tankless water heater, a first valve connected to an input of the tankless water heater, and a second valve connected to an output of the tankless water heater. Where at least one of the first valve or the second valve includes the isolation valve as described above.

Another exemplary aspect of the invention is a tankless water heating system including a tankless water heater, a first valve connected to an input of the tankless water heater, and a second valve connected to an output of the tankless water heater. Where the first valve and the second valve each include the isolation valve as described above.

BRIEF DESCRIPTION OF THE DRAWINGS

The foregoing and other purposes, aspects and advantages will be better understood from the following detailed description of a preferred embodiment of the invention with reference to the drawings, in which:

FIG. 10A illustrates a cover for the valve of FIG. 1;

FIG. 10B illustrates a side cross-section view of the handle cover of FIG. 10A;

FIG. 11 illustrates a cross-section view of another embodiment of the isolation valve;

DETAILED DESCRIPTION

Figure 1:
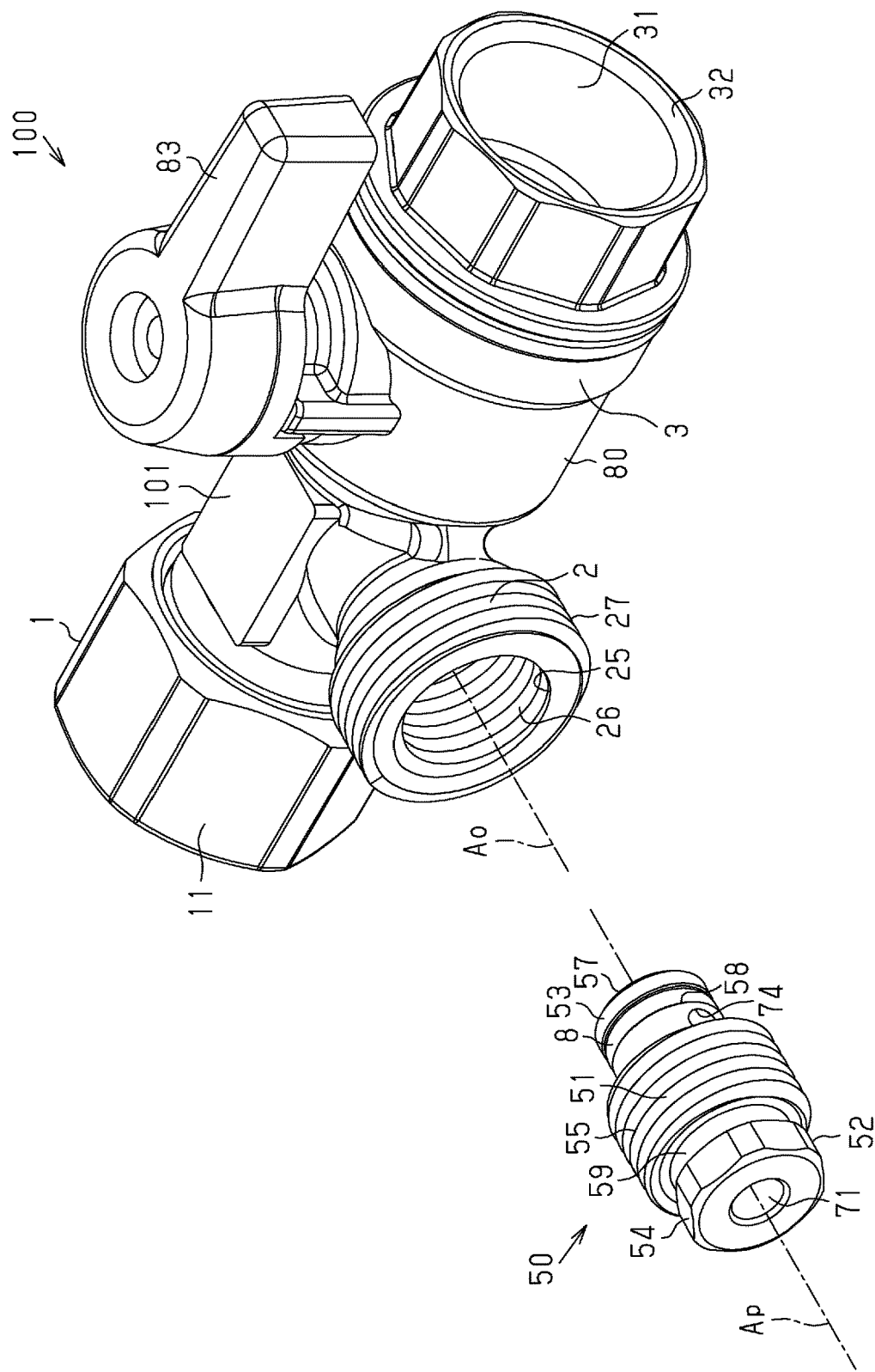
FIG. 1 illustrates a perspective view of an embodiment of the isolation valve.

Referring now to the drawings, and more particularly to FIGS. 1-13, there are shown exemplary embodiments of the method and structures according to the present invention.

In an exemplary embodiment, as illustrated in FIGS. 1-7, isolation valve 100 includes a valve main body 101 having a first port 1, a second port 2 and a third port 3, each of the three ports connecting to the valve main fluid passage 4.

The first port 1 has a threaded member 11 (threads not shown) which is rotatable relative to the valve main body 101. In other words, the threaded member 11 is attached to the valve main body 101 so as to be rotatable. This allows the first port 1 to be screwed onto a fitting without requiring rotation of the valve main body 101. The threaded member 11 includes a gasket 12.

The third port 3 has a threaded portion 31 (threads not shown) which is fixed relative to the valve main body 101. The third port 3 also includes a ball valve 80. The ball valve 80 connects the third port opening 32 to the fluid passage 4. The ball valve 80 includes a ball valve ball 81 having a through hole 82 and a handle 83 which is used to rotate the ball valve ball 81. In the open state, the ball valve ball 81 is rotated so that the through hole 82 is aligned with the fluid passage 4, so as to create a passage through which fluid may flow from the opening 32 to the fluid passage 4. When the ball valve 80 is fully closed, the ball valve ball 81 is rotated so that the fluid passage 4 does not connect with the opening 32, thus preventing fluid flow to or from the opening 32.

Second port 2 is formed on a side of the valve main body 101 so as to face in a direction orthogonal to the directions faced by first port 1 and third port 3. Second port 2 includes an internally threaded section 26 into which a plug 50 is threaded. Second port 2 also includes an externally threaded section 27. Second port 2 can be opened and closed by tightening and loosening plug 50 which engages with the internal threads of internally threaded section 26. The external threads of externally threaded section 27 allow an attachment, such as the hose of a cleaning unit, to be attached to second port 2.

The second port 2 includes a first tapered portion 24, which is located on a side of the inner wall 23 opposite the opening of outlet 25 of second port 2. First tapered portion 24 has a radius which decreases as it extends away from outlet 25. A first angle, angle β, is the angle of the first tapered portion 24 relative to the center axis Ao of the opening of the outlet 25 of second port 2. For illustration purposes, angle β is shown relative to a line parallel to the center axis Ao of the opening of outlet 25 in FIG. 4A.

Plug

Figure 4A:
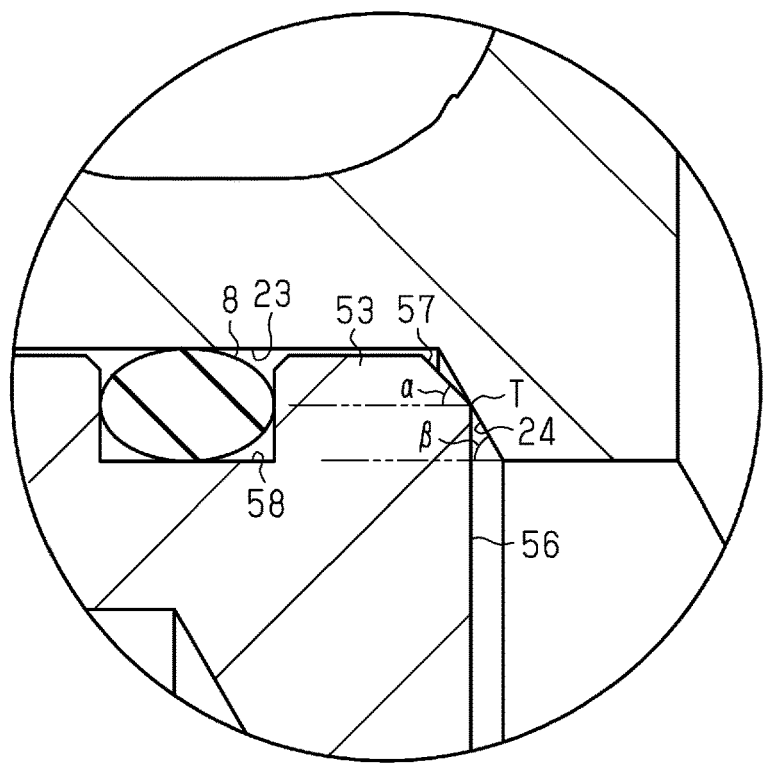
FIG. 4A illustrates close-up view of a cross-section of the contact point between the plug and outlet of FIG. 3.

Plug 50 includes a center portion 51, a proximal end portion 52, which when installed is located on a side of the center portion 51 opposite the second port 2, and a distal end portion 53 located at an end of the center portion 51 opposite the proximal end portion 52. Center portion 51 includes threads 55 formed on an outer surface of center portion 51 and located between the proximal end portion 52 and the distal end portion 53. Threads 55 are formed so as to engage with the internally threaded section 26 of second port 2. The proximal end portion 52 of the plug 50 includes a tool receiving portion 54 which is shaped so as to engage with a tool, for example a wrench. Distal end portion 53 includes an end face 56 and a second tapered portion 57 which extends from the end face 56 towards the proximal end portion 52 of the plug 50, such that the radius of the second tapered portion 57 increases as it extends away from the end face 56. The second tapered portion 57 relative to a center axis Ap of the plug 50 forms a second angle, angle α. For illustration purposes, as shown in FIG. 4A, angle α is shown relative to a line parallel to the center axis Ap of the plug 50. Plug 50 includes a recess 58 into which an O-ring 8 is positioned. The O-ring 8 is sized so that a portion of the O-ring 8 extends from recess 58 in the radial direction so as to form a seal on an inner wall 23 of second port 2.

As can be seen in FIG. 4A, the slope of the first tapered portion 24 is different from the slope of the second tapered portion 57. That is, the angle β is greater than the angle α. When plug 50 is inserted into second port 2 in the closed position, the central axis Ap of plug 50 is substantially coincident with the central axis Ao of the opening of outlet 25 of second port 2. This allows the second tapered portion 57 to contact the first tapered portion 24 at a region T around an entire circumference of the first tapered portion 24, and thus produces a seal through the metal on metal contact between the plug 50 and the second port 2.

The contact region T, of the second tapered portion 57 and first tapered portion 24, creates a first seal through, in this embodiment, a metal on metal contact around the entire circumference of the first tapered portion 24. Thus, fluid is prevented from passing the first seal at contact region T by a barrier formed by the end face 56 and a portion of the second tapered portion 57.

Figure 4B:
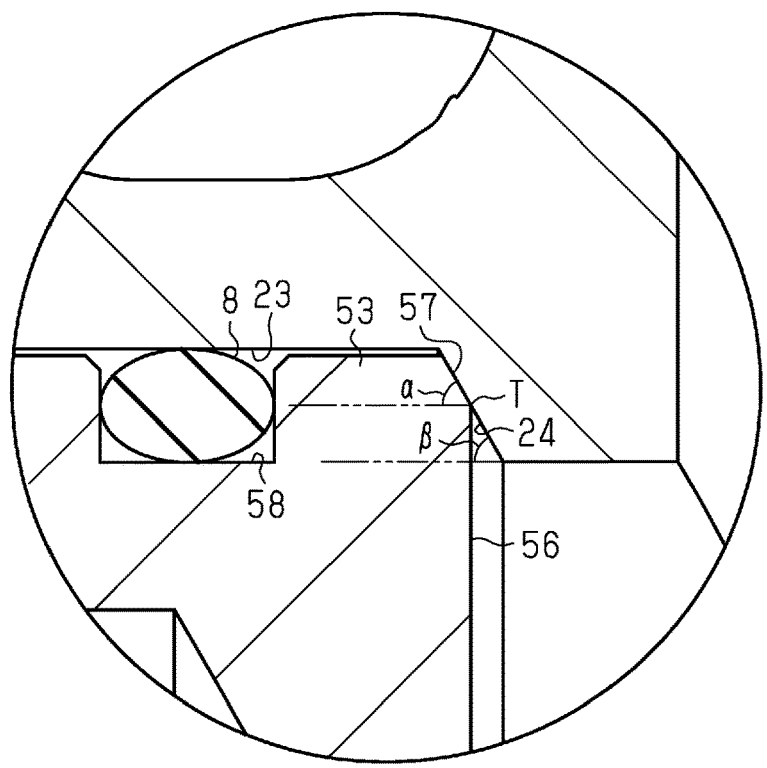
FIG. 4B illustrates close-up view of a cross-section of the contact point between the plug and outlet of FIG. 3 in an alternative embodiment.
Figure 5:
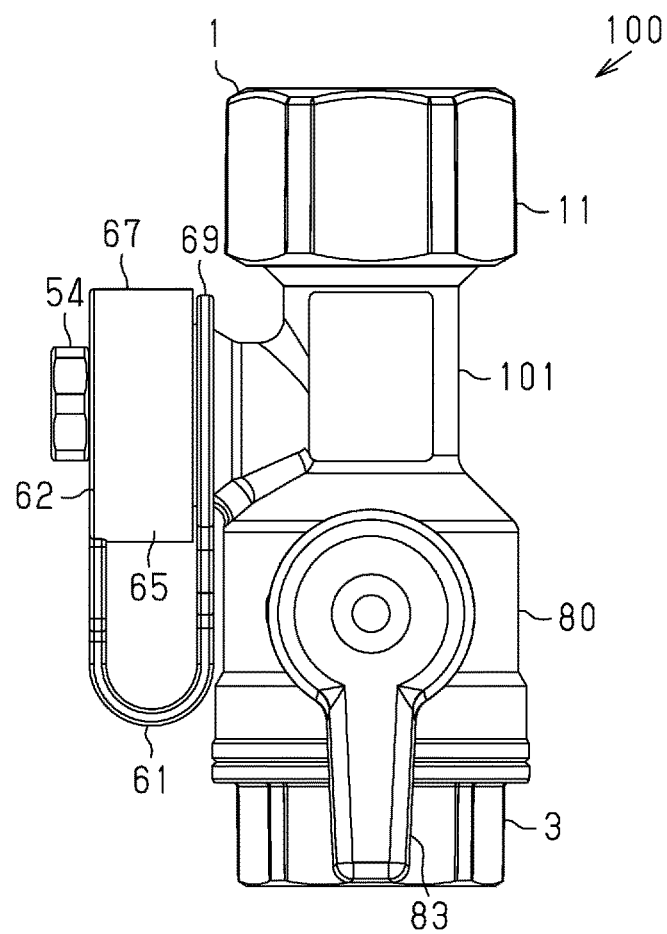
FIG. 5 illustrates a side view of the valve of FIG. 1.

While the slopes of first tapered portion 24 and second tapered portion 57 have been described as not being equal, it is possible to form the contact region T when the slopes are substantially the same. FIG. 4B illustrates an alternative embodiment, where the angle α is equal to angle β. All reference numerals and other aspects of this alternative embodiment are the same as those of FIG. 4A and will not be described. In the embodiment of FIG. 4B the area of contact region T may be larger because the angles α and β are equal. Therefore, in some embodiments, the contact region T may encompass, for example, the entirety of second tapered portion 57.

A second seal is provided by the O-ring 8 and the inner wall 23 of second port 2. The first seal combined with the second seal creates a redundant sealing system for second port 2.

When there is a sudden inflow of fluid pressure, such as from opening the valve to the water source or from a water hammer effect in the system, in the absence of a first seal the O-ring 8 would be hit by a pressure wave from the fluid. This sudden and strong impact of fluid can dislodge or damage the O-ring 8 and so cause a loss of sealing function at second port 2. Therefore, the inclusion of a first seal can guard against this, as it will absorb the impact of the fluid pressure and is more resistant to such impacts as a result of being a metal on metal seal.

The first seal can also perform the function of a backup seal in the event that the O-ring 8 fails. For instance, if the O-ring 8 is dislodged from a sudden impulse of water, such as from a water hammer effect, or if the O-ring 8 is dislodged because the water is turned on before plug 50 is fully closed to establish the first seal, then the first seal can still stop the flow of water from second port 2 when the plug 50 is fully tightened, even if the O-ring 8 is in a non-functional state.

This system also can protect the O-ring 8 from constant deterioration from contact with the hot water from the tankless water heater, as the first seal can both provide protection in the event O-ring 8 fails, and prevent the failure of O-ring 8 by preventing deterioration from constant contact with the water, as the first seal is located upstream of the O-ring.

Drain

Figure 2:
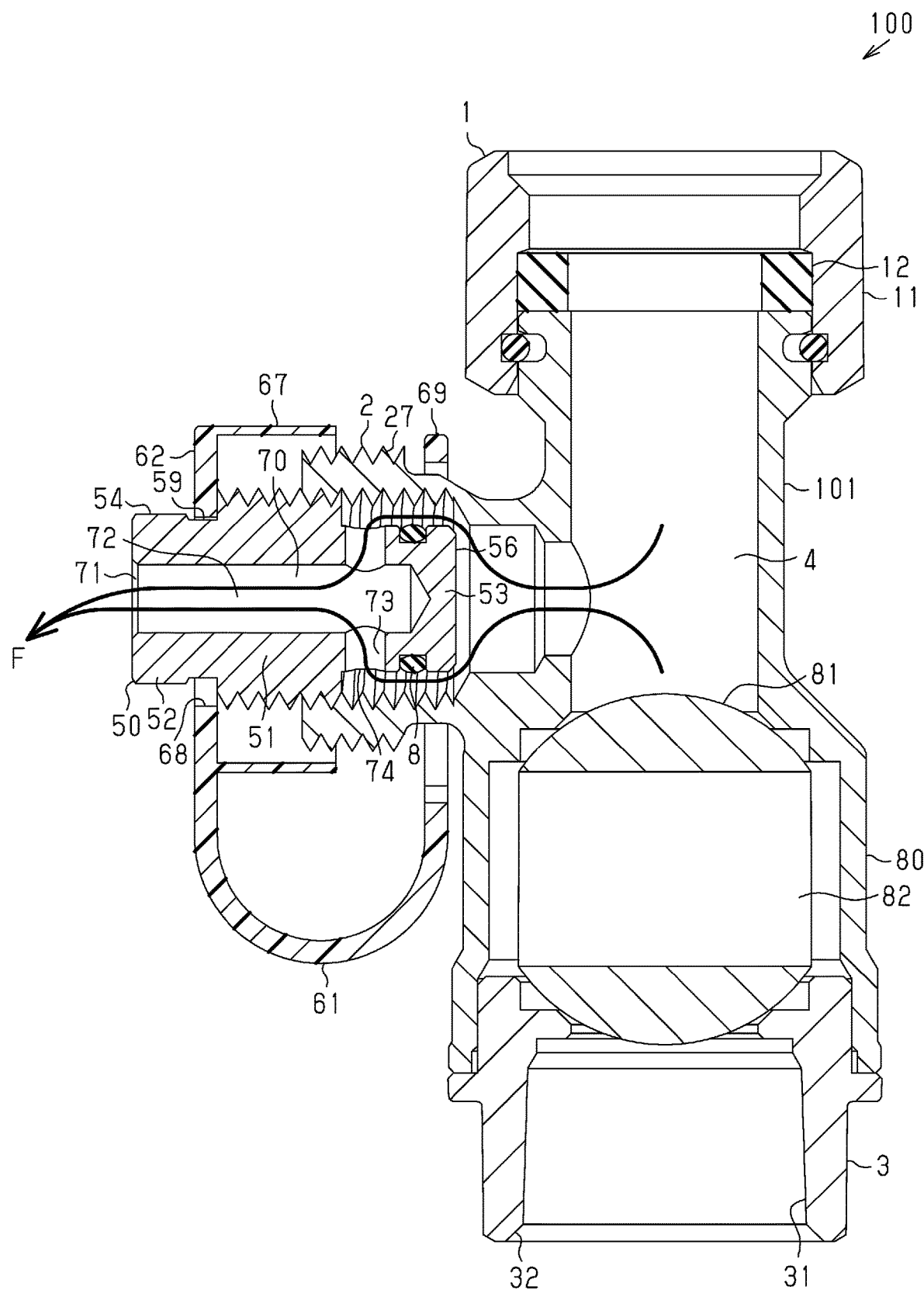
FIG. 2 illustrates a cross-section view of the valve of FIG. 1 in with the plug in a drain position.
Figure 3:
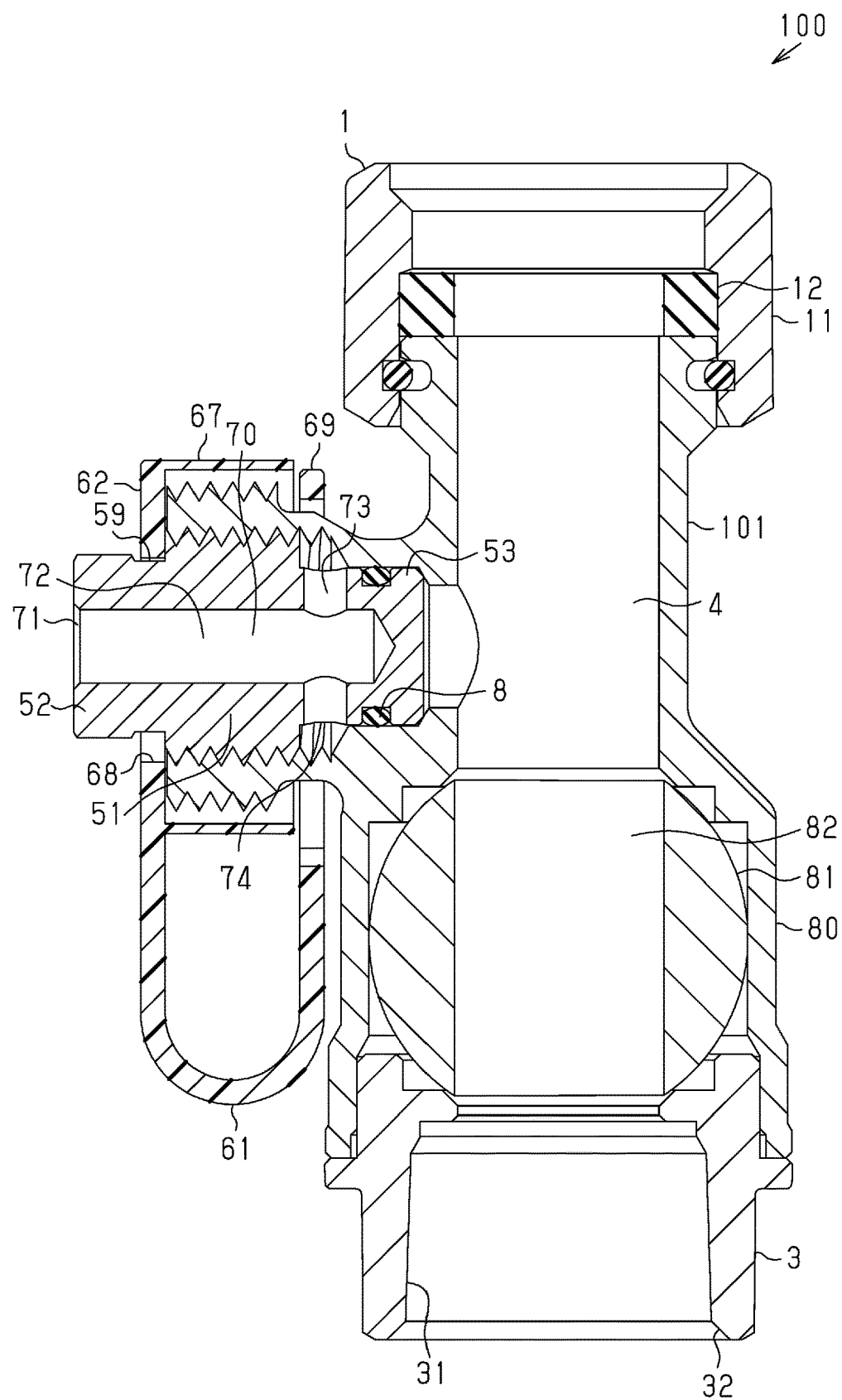
FIG. 3 illustrates a cross-section view of the valve of FIG. 1 in with the plug in a closed position.
Figure 6:
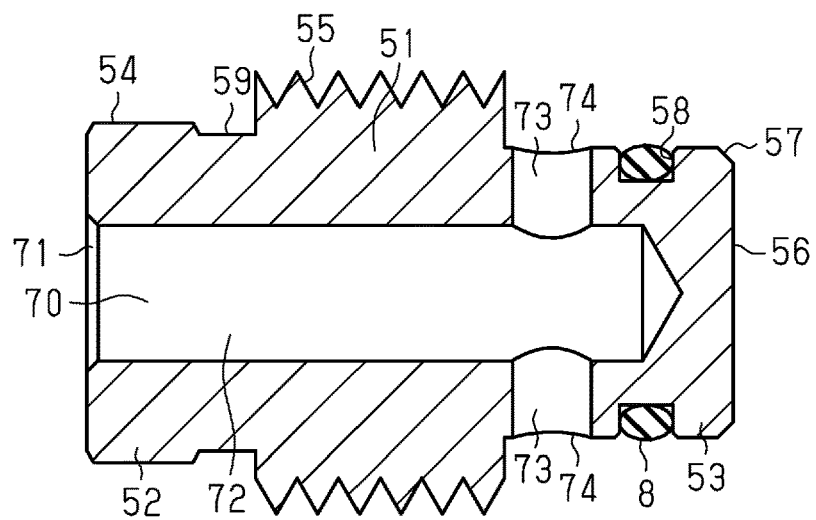
FIG. 6 illustrates a cross-section view of the plug of FIG. 1.
Figure 7:
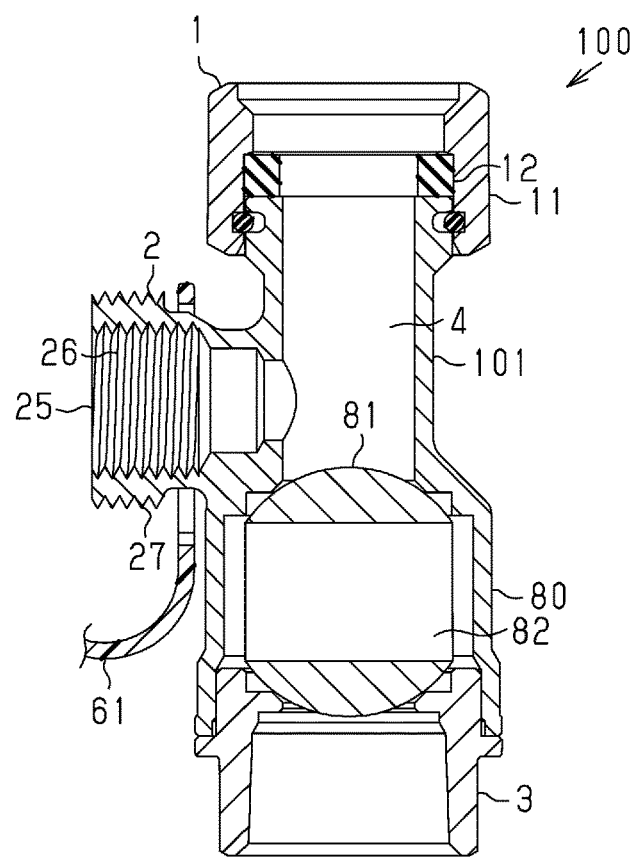
FIG. 7 illustrates a cross-section view of the valve of FIG. 1 with the plug removed and a portion of the cover.

In some embodiments, as shown in FIGS. 2, 3 and 6, the plug 50 may include a drain 70. Drain 70 includes a drain outlet 71 located in the proximal end portion 52, a main passage 72 which extends from the drain outlet 71 towards to distal end portion 53, and inlets 73 which extend outwardly from the main passage 72 so as to create an inlet opening 74 in the side wall of the center portion 51. In the embodiment illustrated in FIG. 6, the inlets 73 extend outward from the main passage 72 in the radial direction. Two inlets 73 are provided in this embodiment, the inlets 73 extending from the main passage 72 in a direction perpendicular to the central axis Ao. In this particular embodiment, the two inlets 73 extend on a single axis in the radial direction. This allows the two inlets 73 to more easily formed, for example through a single machining operation.

Inlets 73 are formed so that the inlet openings 74 are positioned between the proximal end portion 52 and the recess 58. As illustrated in FIG. 3, the location of inlet opening 74 is sufficiently close to the distal end portion 53 so that when the plug 50 is in a closed position, that is where second tapered portion 57 contacts first tapered portion 24 at region T, the inlet opening 74 is cut-off from the fluid passage 4. Further, when the plug 50 is in a drain position, that is when the plug is loosened so that second tapered portion 57 does not contact first tapered portion 24 but plug 50 is still engaged with second port 2 by the threads of the plug 50 and internal threads of second port 2, as shown in FIG. 2, the inlet opening 74 is connected to fluid passage 4 so as to allow water to flow from fluid passage 4, through inlet opening 74, inlet 73, main passage 72, and out of drain outlet 71, as shown by flow path F.

Tankless Water Heating System

Figure 8:
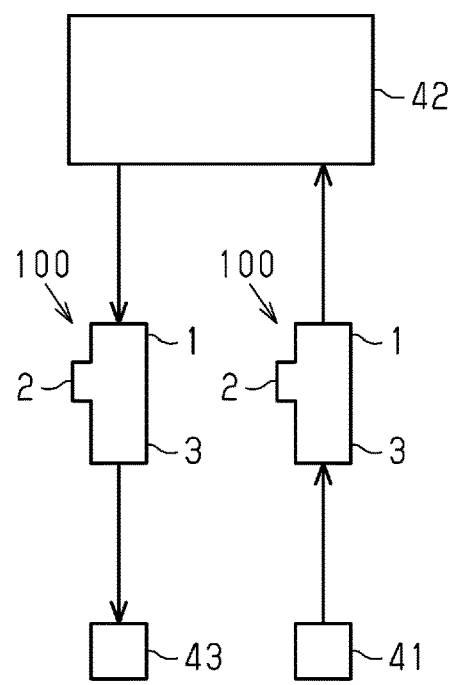
FIG. 8 illustrates a tankless water heater system using an embodiment of the isolation valve.
Figure 9:
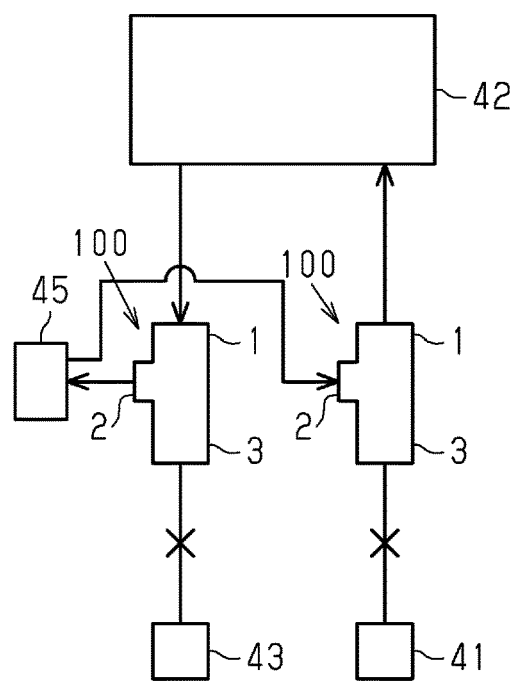
FIG. 9 illustrates a tankless water heater system using an embodiment of the isolation valve and a cleaning apparatus.

As shown in FIGS. 8 and 9, a tankless water heating system utilizing a pair of valves 100 includes a water supply 41, a tankless water heater 42, and a water destination 43. The water supply 41 connects to the third port 3 of a first valve 100. The first port 1 of the first valve 100 is connected to the tankless water heater 42. The outlet of the tankless water heater 42 is connected to the first port 1 of a second valve 100. The third port 3 of the second valve 100 is connected to the water destination 43.

As illustrated in FIG. 8, during normal operation, the ball valves 80 of both the first valve 100 and the second valve 100 are open, while the plugs 50 of the first and second valves 100 are in the closed position. This allows water to flow from the water supply 41, through the tankless water heater 42, and out to the water destination 43.

When it is desired to bypass the tankless water heater 42, the ball valves 80 of both the first and second valves 100 are placed in the closed position. Next, the plugs 50 of the first and second valves 100 are opened to the drain position. Water is then drained from the tankless water heating system through the second port 2 of the second valve 100. In particular, in an embodiment using a plug 50 including a drain 70, the water may be drained from the drain outlet 71. The water may be drained passively, such as through the use of gravity, or by an active means such as pumping. Once the water has been drained, the plugs 50 are removed.

As shown in FIG. 9, a cleaning apparatus 45 can then be attached to the first and second valves 100 at the second ports 2. The cleaning apparatus 45 may be a pumping apparatus which can circulate a cleaning fluid through the tankless water heater 42. Cleaning solution from the cleaning apparatus 45 may be introduced through second port 2 of the first valve 100, through the use of a hose with a threaded end which is attached to second port 2, for example, through the use of externally threaded section 27. The cleaning fluid circulates through the tankless water heater 42 and is returned to the cleaning apparatus 45 through second port 2 of the second valve 100, through the use of a hose attached to second port 2. This allows the tankless water heater 42 to be cleaned while isolated from the water supply 41 and water destination 43. Once cleaning is completed, the cleaning apparatus is detached from the second ports 2 of the first and second valves 100 and the plugs 50 are returned and placed in the closed position in both valves 100. Once plugs 50 have been returned and closed, then the ball valves 80 of the first and second valves 100 are opened.

Cover

As illustrated in FIGS. 10A and 10B, the isolation valve 100 may also include a removeable cover 90 which covers the handle 83 of ball valve 80 and also serves as a wrench for tightening and loosening plug 50. Cover 90 includes a cover main body 94 having a handle recess 91 that is shaped to cover handle 83 of ball valve 80. The cover 90 allows the handle 83 of the ball valve 80 to be covered so as to protect it and the environment from impact and other damage.

The cover 90 also includes a plug coupling portion 92 which is formed to fit onto the tool receiving portion 54 of plug 50. The side walls 93 of plug coupling portion 92 are sized so as to engage with the tool receiving portion 54. Plug coupling portion 92 is formed of a flexible material, such as plastic, and the side walls 93 are formed so that when a rotation force is applied to the plug 50 with the plug coupling portion 92, the plug coupling portion 92 will elastically deform once a certain amount of torque is applied causing the side walls 93 to slip on the tool receiving portion 54 and therefore prevent overtightening of the plug 50. That is, cover 90 will only allow a certain amount of tightening force to be applied to plug 50 before the plug coupling portion 92 deforms to cause a slipping between the plug coupling portion 92 and the tool receiving portion 54, and thereby prevents excessive force from being applied to plug 50. This feature can prevent overtightening of the plug 50, damage to the second tapered portion 57 and first tapered portion 24, and other issues caused by excessive torque applied to the plug 50.

Cover 90 may also include a plug cover 65, connected to the cover main body 94 through connecting member 66. Plug cover 65 may be in the form of a half cylinder having a top wall 62 and a side wall 67 extending from the top wall 62. Top wall 62 may include an attachment hole 68, which is sized to fit into an attachment groove 59 formed on plug 50. The side wall 67 extends so as to cover the externally threaded section 27 of second port 2 when the plug 50 is in the closed position. Plug cover 65 also includes an attachment member 69, which connects to the plug cover 65 through a tether 61, that connects to a portion of second port 2 that is located inward of the externally threaded section 27. The entirety of cover 90 may be formed of a single flexible member.

FIG. 11 illustrates another embodiment of the isolation valve. In this embodiment valve 200 includes a pressure relief valve port 202. Pressure relief valve port 202 connects to the fluid passage 4 and allows for the attachment of a pressure relief valve (not shown). This allows a pressure relief valve to be incorporated into the isolation valve 200. The other features of the embodiment of FIG. 11 are the same as those of the embodiment illustrated in FIGS. 1-7 and will not be described.

Figure 12:
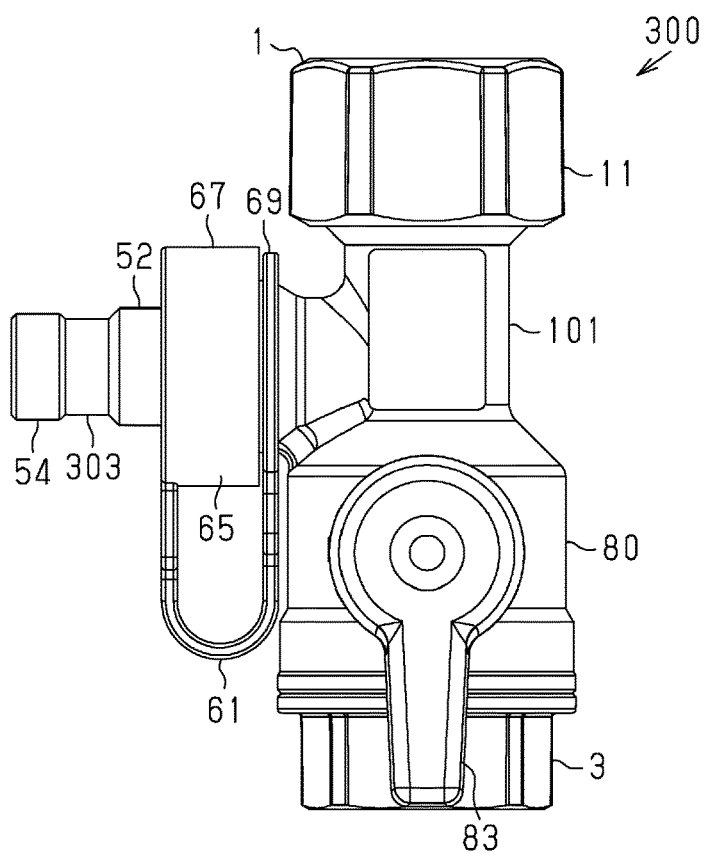
FIG. 12 illustrates another embodiment of the isolation valve.
Figure 13:
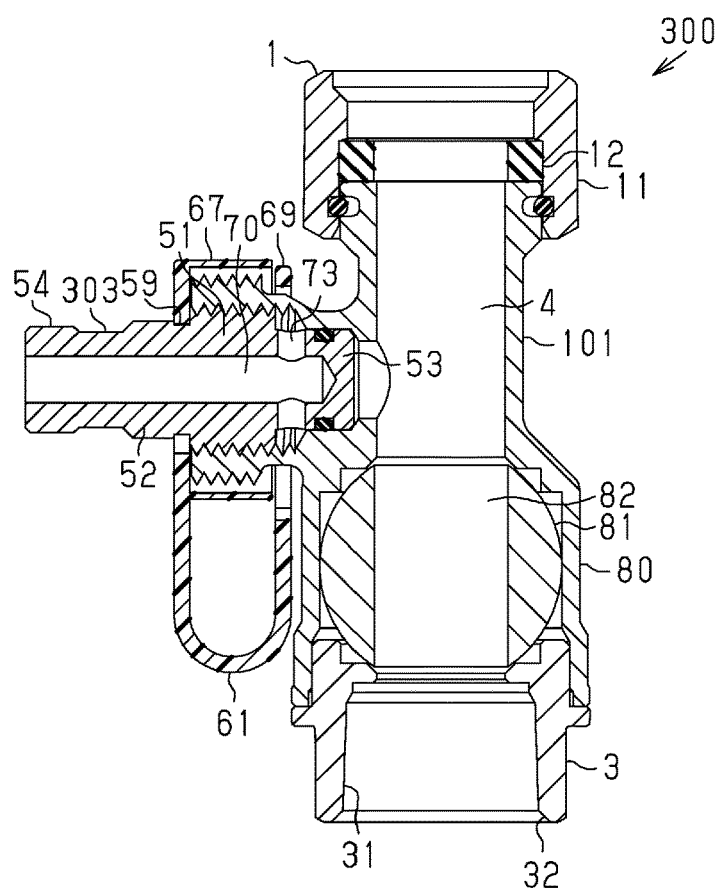
FIG. 13 illustrates a cross-section view the isolation valve of FIG. 12.

FIGS. 12 and 13 illustrate another embodiment of isolation valve. In the embodiment of FIGS. 12 and 13, valve 300 includes a proximal end portion 52 that has a small diameter portion 303 between groove 59 and tool receiving portion 54. That is, the diameter of the proximal end portion 52 becomes smaller after the tool receiving portion 54 and then increases again prior to groove 59. The other features of the embodiment of FIGS. 12 and 13 are the same as those of the embodiment illustrated in FIGS. 1-7 and will not be described.

The features of the different embodiments may be combined as long as the combined features are compatible with each other.

Advantages associated with the exemplary embodiments of the invention will now be described.

The use of the plug 50 instead of a second ball valve provides several advantages over an isolation valve which incorporates two ball valves. The first advantage is a reduction in cost because less metal material is needed for the port having the plug 50, than a port including a ball valve. This also results in the valve 100 weighing less than an isolation valve having two ball valves. In addition, the costs may be further reduced due to a design having a plug and one ball valve being easier to manufacture than a design having two ball valves. Furthermore, the use of the plug 50 allows the valve 100 to have a smaller footprint. This reduction of weight and size enables greater flexibility in the design of a system utilizing such valves.

The use of the first seal formed between second tapered portion 57 and first tapered portion 24 at contact region T provides several advantages.

Conventionally, plugs have not been used in isolation valves for tankless water heaters, as the O-ring would be subject to deterioration which would result in the plug leaking. By having the first seal at point T, upstream of the O-ring 8, deterioration of the O-ring 8 due to long term contact with fluid may be avoided.

In addition, in the event that the water is suddenly turned on while the plug is partially open so that the first seal is not formed the sudden pressure of the wave of water hitting the O-ring 8 can cause the O-ring 8 to be dislodged from the recess 58. This could also result in a case where and the O-ring 8 is not yet fully engaged with the inner wall 23 of the second port 2. As a result, the O-ring 8 may not create an adequate seal. If the plug 50 is then tightened to attempt to establish a seal with the dislodged O-ring 8, the O-ring 8 may be damaged or deformed so as to not form a seal. By having the additional sealing location at contact area T, even if the O-ring 8 is dislodged or damaged, sufficient sealing may be still obtained between the plug 50 and the second port 2.

In addition, in a plug which does not have the first seal of plug 50, a water hammer effect can also dislodge an O-ring, as the rush of water will directly impact the O-ring 8. This can cause a leak in a fluid system, such as a tankless water heater. Having the additional sealing location at contact area T protects the O-ring 8 from the sudden impulse of water caused by, for example, a water hammer or other disturbance. This allows plug 50 to be utilized in water systems where potential leaks are a concern.

These embodiments also provide the safety of a redundant seal, in that the second port 2 is still sealed closed by O-ring 8, even when plug 50 is not tightened sufficiently to cause a seal at region T.

In addition, the use of a contact region T where α and β are not equal may require less torque to tighten and obtain an adequate seal than one in which α and β are equal.

The drain 70 in plug 50 also confers several advantages. In a system without a drain 70, when the plug is removed to drain the water heater any water in the tankless water heater will spill out suddenly in an uncontrolled manner at a potentially high speed and volume. Because of the positioning of the plug, it is also not possible to attach an effective capture mechanism to the second port 2 prior to plug removal.

Drain 70 allows the fluid to be gradually drained at a chosen and controlled rate through the drain outlet 71. This allows the fluid to be conveniently captured at a specific controlled point. In addition, the use of the drain 70 allows drainage through drain outlet 71, which allows the positioning of a capture device (such as a container), or attachment of a hose to drain outlet 71, before opening the drain 70.

Modifications to the Embodiments

While the invention has been described using particular embodiments, the invention is not limited to those embodiments. For instance, a tankless water heating system my incorporate one isolation valve as described in the embodiments, while having the other isolation valve include two ball valves instead of a plug. The isolation valve may also be used in systems other than those with a tankless water heater.

While second port 2 has internal and external threads, it is possible to omit one set of the threads. For example, external threads may be omitted and the cleaning apparatus 45 may be attached using the internal threads.

While it is described that threaded member 11 is rotatable relative to valve main body 101 and threaded portion 31 is fixed relative to third port 3, either, both, or neither of threaded member 11 and threaded portion 31 may be rotatable relative to valve main body 101.

The embodiments shown incorporate drain 70, however the plug 50 may omit drain 70. Similarly, the plug 50 may omit either the recess 58 and O-ring 8, or may omit the first seal at contact region T.

The embodiments are described as having two inlets 73, however the number of inlets 73 is not particularly limited. Further the angle of the inlets 73 relative to the plug central axis Ap, may be varied as desired.

Cover 90 may exclude any of subcomponents, such as the plug cover 65, the cover main body 94, the attachment member 69, plug coupling portion 92, etc. Optionally, the cover 90 may be omitted entirely from the isolation valve 100.

Further, the materials from which the isolation valve are formed may be changed to any suitable combination of materials. For example, the plug 50 and valve main body 101 may be made of different materials. Additionally, ball valve 80 may be replaced with some other openable and closable valve system.

While the invention has been described in terms of exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

The invention claimed is:

1. An isolation valve comprising:
   a main body including a fluid passage;
   a first port connected to the fluid passage;
   a second port connected to the fluid passage;
   a third port including an openable and closable valve, the valve connecting the third port to the fluid passage; and
   a plug removably coupled to the second port,
   wherein the second port includes:
      an outlet including an opening to an outside of the isolation valve;
      an internally threaded section formed on a portion of an inner surface of the outlet; and
      a first tapered portion having a diameter which decreases as the first tapered portion extends away from the outlet, a first angle is defined by the first tapered portion relative to a central axis of the outlet,
   wherein the plug includes:
      a center portion;
      a proximal end portion located on a side of the center portion opposite the second port;
      a distal end portion located on a side of the center portion opposite the proximal end portion, the distal end portion including a second tapered portion, the second tapered portion being shaped so as to engage the first tapered portion of the second port when the plug is in a closed position, a second angle is defined by the second tapered portion relative to a central axis of the plug; and
      threads located on an outer diameter of the center portion and configured to engage the internally threaded section of the second port; and
   wherein the first angle is not equal to the second angle.

2. The isolation valve according to claim 1, wherein the first angle is less than the second angle.

3. The isolation valve according to claim 1, wherein the valve of the third port is a ball valve including a handle to open and close the ball valve, and
   wherein the proximal end portion of the plug includes a tool receiving portion.

4. The isolation valve according to claim 3, wherein the second port further includes an externally threaded section formed on a portion of an outer surface of the outlet.

5. The isolation valve according to claim 1, further comprising a pressure relief valve port connected to the fluid passage and configured to receive a pressure relief valve.

6. A tankless water heating system comprising:
   a tankless water heater;

a first valve connected to an input of the tankless water heater; and
a second valve connected to an output of the tankless water heater,
wherein at least one of the first valve or the second valve includes the isolation valve according to claim 1.

7. An isolation valve comprising:
a main body including a fluid passage;
a first port connected to the fluid passage;
a second port connected to the fluid passage;
a third port including an openable and closable valve, the valve connecting the third port to the fluid passage; and
a plug removably coupled to the second port,
wherein the second ort includes:
    an outlet including an opening to an outside of the isolation valve;
    an internally threaded section formed on a portion of an inner surface of the outlet; and
    a first tapered portion having a diameter which decreases as the first tapered portion extends away from the outlet, a first angle is defined by the first tapered portion relative to a central axis of the outlet,
wherein the plug includes:
    a center portion;
    a proximal end portion located on a side of the center portion opposite the second port;
    a distal end portion located on a side of the center portion opposite the proximal end portion, the distal end portion including a second tapered portion, the second tapered portion being shaped so as to engage the first tapered portion of the second port when the plug is in a closed position, a second angle is defined by the second tapered portion relative to a central axis of the plug; and
    threads located on an outer diameter of the center portion and configured to engage the internally threaded section of the second port, and
wherein the plug further includes:
    a drain, the drain including:
        a main passage extending through the center portion;
        a drain outlet in the proximal end portion and connected to the main passage; and
        an inlet including an inlet opening in the center portion and extending from the inlet opening to the main passage, the inlet opening being disposed between, in an axial direction of the plug, the threads and the second tapered portion.

8. The isolation valve according to claim 7, wherein the drain includes two of the inlets, the inlets having a same central axis which extends through the central axis of the main passage.

9. A tankless water heating system comprising:
a tankless water heater;
a first valve connected to an input of the tankless water heater; and
a second valve connected to an output of the tankless water heater,
wherein the first valve and the second valve each include the isolation valve according to claim 7.

10. An isolation valve comprising:
a main body including a fluid passage;
a first port connected to the fluid passage;
a second port connected to the fluid passage;
a third port including an openable and closable valve, the valve connecting the third port to the fluid passage, and
a plug removably coupled to the second port,
wherein the second port includes:
    an outlet including an opening to an outside of the isolation valve;
    an internally threaded section formed on a portion of an inner surface of the outlet; and
    a first tapered portion having a diameter which decreases as the first tapered portion extends away from the outlet a first angle is defined by the first tapered portion relative to a central axis of the outlet,
wherein the plug includes:
    a center portion;
    a proximal end portion located on a side of the center portion opposite the second port;
    a distal end portion located on a side of the center portion opposite the proximal end portion, the distal end portion including a second tapered portion, the second tapered portion being shaped so as to engage the first tapered portion of the second port when the plug is in a closed position, a second angle is defined by the second tapered portion relative to a central axis of the plug; and
    threads located on an outer diameter of the center portion and configured to engage the internally threaded section of the second port, and
wherein the plug further includes:
    a recess on an outer surface of the plug between the threads and the distal end portion; and
    an O-ring disposed in the recess so as to contact a portion of the inner surface of the outlet adjacent to the internally threaded section when the plug is in the closed position.

11. An isolation valve comprising:
a main body including a fluid passage;
a first port connected to the fluid passage;
a second port connected to the fluid passage;
a third port including an openable and closable valve, the valve connecting the third ort to the fluid passage;
a plug removably coupled to the second port; and
a removeable cover which covers a portion of the isolation valve,
wherein the second port includes:
    an outlet including an opening to an outside of the isolation valve;
    an internally threaded section formed on a portion of an inner surface of the outlet; and
    a first tapered portion having a diameter which decreases as the first tapered portion extends away from the outlet, a first angle is defined by the first tapered portion relative to a central axis of the outlet,
wherein the plug includes:
    a center portion;
    a proximal end portion located on a side of the center portion opposite the second port;
    a distal end portion located on a side of the center portion opposite the proximal end portion, the distal end portion including a second tapered portion the second tapered portion being shaped so as to engage the first tapered portion of the second port when the plug is in a closed position, a second angle is defined by the second tapered portion relative to a central axis of the plug; and
    threads located on an outer diameter of the center portion and configured to engage the internally threaded section of the second port,
wherein the valve of the third port is a ball valve including a handle to open and close the ball valve,
wherein the proximal end portion of the plug includes a tool receiving portion, and wherein the second port further includes an externally threaded section formed on a portion of an outer surface of the outlet.

12. The isolation valve according to claim 11, wherein the cover includes a plug cover which covers at least a portion of the externally threaded section of the second port.

13. The isolation valve according to claim 12, wherein the plug further includes a groove disposed between the threads and the proximal end portion,
wherein the cover is formed of a flexible material, and
wherein the cover further includes an attachment member connected to the plug cover and the groove.

14. The isolation valve according to claim 11, wherein the cover includes a handle portion, the handle portion including:
a recess shaped to fit onto the handle of the ball valve; and
a plug coupling portion shaped so as to engage with the tool receiving portion of the plug.

15. The isolation valve according to claim 14, wherein the plug coupling portion is configured to elastically deform so as to cause slipping on the tool receiving portion of the plug when a predetermined amount of torque is applied to the plug coupling portion.

\* \* \* \* \*